United States Patent
Thaveeprungsriporn et al.

(10) Patent No.: US 7,508,633 B1
(45) Date of Patent: Mar. 24, 2009

(54) ASYMMETRIC LOAD BEAM FOR IMPROVING RESONANCE PERFORMANCE OF HARD DISK DRIVE SUSPENSION

(75) Inventors: Visit Thaveeprungsriporn, Bangkok (TH); Khampon Sittipongpanich, Bangkok (TH)

(73) Assignee: Magnecomp Corporation, Temecula, CA (US)

( * ) Notice: Subject to any disclaimer, the term of this patent is extended or adjusted under 35 U.S.C. 154(b) by 59 days.

(21) Appl. No.: 11/303,183

(22) Filed: Dec. 15, 2005

Related U.S. Application Data

(60) Provisional application No. 60/638,883, filed on Dec. 21, 2004.

(51) Int. Cl.
*G11B 5/48* (2006.01)
(52) U.S. Cl. .................................. 360/244.9
(58) Field of Classification Search .............. 360/244.2, 360/244.8, 244.9, 245.9, 75; 156/182; 74/490.01
See application file for complete search history.

(56) References Cited

U.S. PATENT DOCUMENTS

| | | | | |
|---|---|---|---|---|
| 5,936,803 A * | 8/1999 | Berding | .................... | 360/244.8 |
| 6,043,956 A * | 3/2000 | Hanya et al. | .............. | 360/244.9 |
| 6,397,699 B1 * | 6/2002 | Ikemoto et al. | .......... | 74/490.01 |
| 6,632,310 B2 * | 10/2003 | Freeman et al. | .............. | 156/182 |
| 6,958,879 B2 * | 10/2005 | Oh et al. | ........................ | 360/75 |
| 7,023,665 B2 * | 4/2006 | Riener | ...................... | 360/245.9 |
| 7,280,316 B1 * | 10/2007 | McCaslin et al. | ......... | 360/244.8 |

* cited by examiner

*Primary Examiner*—Tianjie Chen
(74) *Attorney, Agent, or Firm*—Intellectual Propery Law Offices of Joel Voelzke, APC

(57) ABSTRACT

Structure for a load beam used in hard disk drive devices includes an asymmetric structure. The load beam exhibits longitudinal asymmetry (i.e., asymmetry along its long axis) in regard to the weight distribution, but has a center of mass that lies along its longitudinal axis due to the provisioning of counterbalancing features, such as the addition of material, the removal of material, or a combination of adding material and removing material.

14 Claims, 5 Drawing Sheets

▱ Partial etch

ASYMMETRIC LOAD BEAM FOR IMPROVING RESONANCE PERFORMANCE OF HARD DISK DRIVE SUSPENSION

CROSS-REFERENCE TO RELATED APPLICATION

This application is related to and claims priority from U.S. Provisional Application No. 60/638,883, filed Dec. 21, 2004, and is fully incorporated herein by reference for all purposes.

BACKGROUND OF THE INVENTION

The present invention generally relates to a disk drive apparatus. More particularly, the present invention provides a hard disk drive that compensate for flow induced vibrations, commonly called disk flutter.

A hard disc drive (HDD) unit generally uses a spinning storage medium (e.g., a disk or platter) to store data. A read-write head is positioned in close proximity to the spinning storage medium by an HSA (Head Stack Assembly). Mounted on the HSA, a suspension assembly commonly includes a base plate, a load beam, and a flexure trace gimbal to which a slider is mounted. The slider supports the read-write head element. The load beam is generally composed of an actuator mounting section, a spring region, and a rigid region. The spring region gives the suspension a spring force or preload counteracting the aerodynamic lift force created by the spinning medium during reading or writing. A gimbal is mounted at the distal end of the load beam and supports the slider allowing the head to have pitch and roll movement in order to follow the irregularities of the disk surface.

Demand generally requires increased HDD storage capacity, which generally compels higher data track densities for the storage medium. Furthermore, the demand for faster rates of data seeking and accessing also leads to higher rotational speeds. A significant obstacle associated with increasing rotational speeds and storage capacity is often head positioning accuracy as the head flies above the spinning storage medium.

A significant obstacle to head positioning accuracy is disk flutter. Disk flutter is an aero-elastic instability induced by the coupling of the spinning storage medium and the air surrounding the media resulting in disk vibration modes. These flow induced vibrations can physically cause an off-track misalignment of the head to the desired track resulting in failure to access or write data on the right track. Problems associated with disk flutter become more intolerable with higher track densities and disk rotation speeds.

Accordingly, novel solutions for operating hard disk drives to substantially reduce off-track misalignment induce by disk flutter are needed.

BRIEF SUMMARY OF THE INVENTION

Techniques for a disk drive apparatus are provided. More particularly, the present invention provides a method and apparatus for reading and writing information onto a hard disk drive to further improve resonance and flow induced vibration performance. Merely by way of example, illustrative embodiments of the present invention disclose a method and apparatus for a load beam that has an unequal mass distribution, but is configured so that its center of mass lies along the longitudinal axis of the load beam.

Commonly owned and co-pending U.S. application Ser. No. 10/943,804, filed Sep. 16, 2004 and fully incorporated by reference herein, discloses techniques to compensate for flow induced vibrations. For example, in one embodiment, it details a method for operating a disk drive apparatus which includes following by a suspension assembly from a reference position to a second position a vertical movement of a rotating disk. The suspension assembly is predisposed to move from the reference position to the second position by a vertical offset between a first and second struts of the suspension assembly. A read/write head coupled to the suspension assembly is in closer alignment to a selected track during the vertical movement in the second position than if the first and second struts were substantially co-planar (e.g., insignificant or no vertical offset). Further improvements can be achieved by taking into account any mass imbalance resulting from implementations of the vertical offset.

There are various features that can provide a vertical offset between a first and second struts of the suspension assembly. These features may lead to asymmetry suspension assembly creating an imbalance in the center of mass along the longitudinal axis of the load beam. To further improve the benefits of the vertical offset feature on resonance and flow induced vibrations of suspension assembly, the load beam center of mass needs to be fine-tuned. For example, a longitudinal axis drawn down the center of the load beam demarcates a left side and a right side of the load beam. A center of mass is then calculated for each side of the load beam. The addition of stainless steel mass (or other materials) or subtraction of material on either or both sides of the load beam performed to bring the center of mass of both sides to coincide.

Various additional objects, features, and advantages of the present invention can be more fully appreciated with reference to the detailed description and accompanying drawings that follow.

DETAILED DESCRIPTION OF THE INVENTION

The diagrams shows herein are merely examples of various embodiments of the present invention, and therefore should not unduly limit the scope of the claims recited herein. One of ordinary skill in the art would recognize many variations, alternatives, and modifications.

Figure 1:
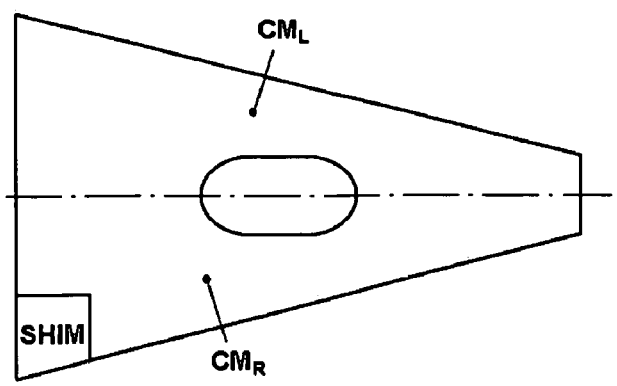
FIG. 1 is a simplified view of an asymmetric full thickness load beam of a suspension assembly according to an embodiment of the present invention.

FIG. 1 is a simplified view of a configuration of an asymmetric full thickness load beam of a suspension assembly. As discussed above in U.S. application Ser. No. 10/943,804, a load beam can be configured with an attachment (shim) to reduce flow-induced vibrations in the load beam.

Figure 8:
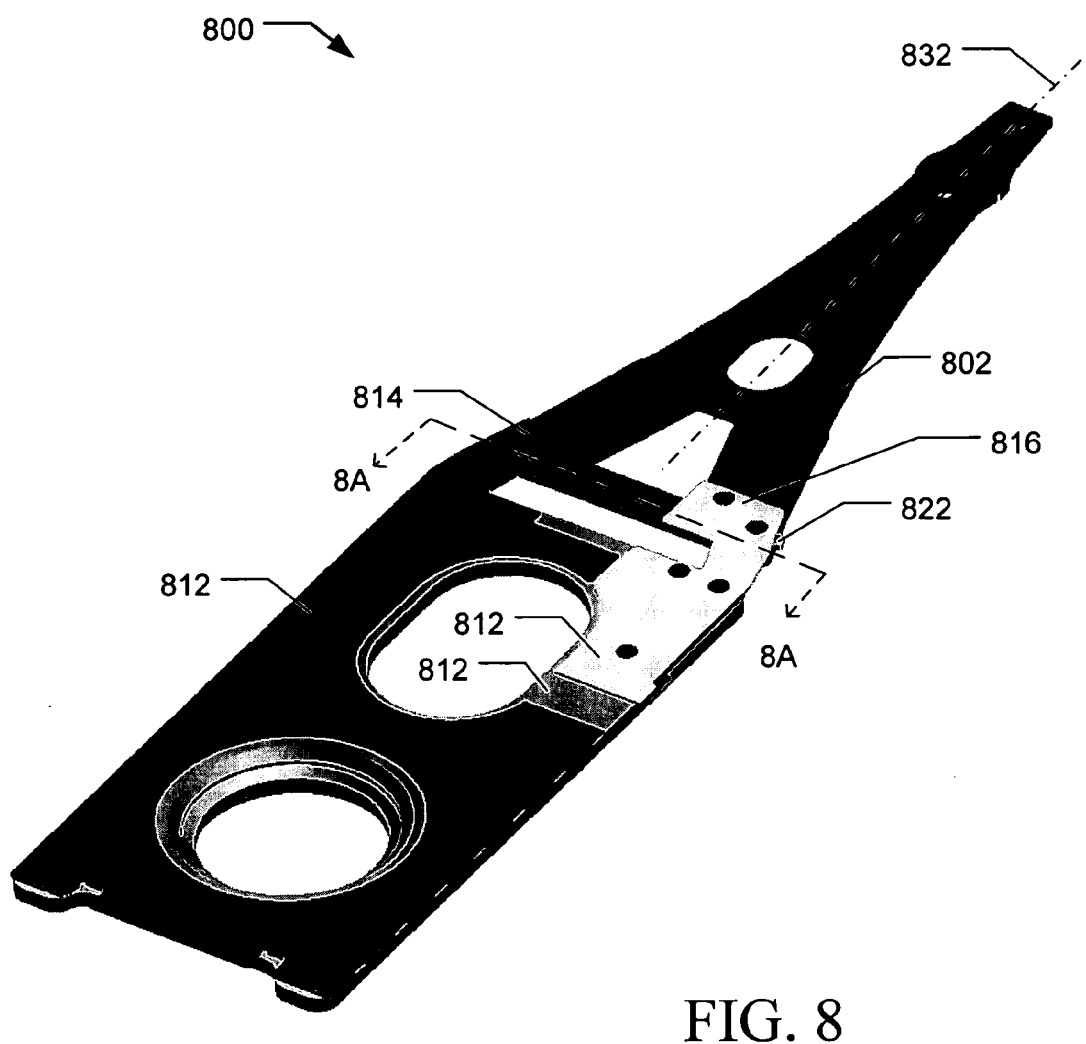
FIG. 8 shows an asymmetric load beam in a suspension assembly for a hard disk drive system.
Figure 8A:
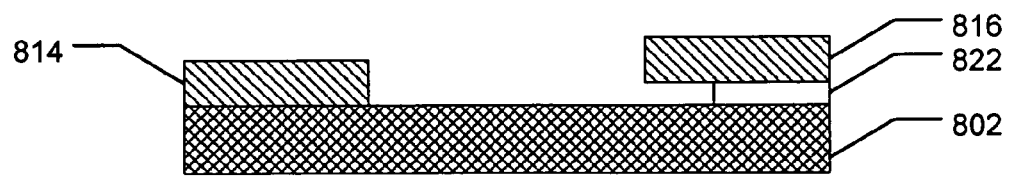
FIG. 8A is a cross-sectional view taken along the view line in FIG. 8.

Referring to FIG. 8 for a moment, a suspension 800 is shown comprising at least a hinged portion 812 coupled to an end of a load beam 802 by way of a hinge 814, 816. The hinge comprises first and second struts, 814, 816. The load beam is connected directly to one strut of the hinge 814. A shim 822 (which can also be referred to as a spacer, vertical offset element, etc.) is connected between another strut of the hinge 816 and the load beam 802. The shim 822 therefore creates a vertical offset hinge where one strut 816 is vertically offset relative to the other strut 814. This construction can be seen more clearly in the cross-sectional view of FIG. 8A taken along view line 8A-8A, and is discussed in more detail in U.S. patent application Ser. No. 10/943,804, serves to reduce flow-induced vibrations in the load beam. Embodiments of additional vertical offset configurations and their effect are more thoroughly discussed in the co-pending application.

The provisioning of the shim produces an asymmetric construction of the load beam which results in asymmetry between the right-side center of mass and the left-side center of mass of the load beam with respect to a longitudinal axis 832 down the length of the load beam. This creates an imbalance in the construction of the load beam resulting in the load beam having a center of mass that does not lie along its longitudinal axis.

FIG. 1 and subsequent figures show a generalized representation of the load beam 802 illustrated in FIG. 8. Although the load beam is generally a unitary structure, the longitudinal axis can be viewed as dividing the load beam into a right side and a left side. A right-side center of mass of the load beam, indicated by a dot and identified by the label $CM_R$, represents the center of mass of the right side of the load beam. Similarly, a left center of mass is indicated by a dot labeled as "$CM_L$". Thus, one can imagine that if the load beam is cut along the longitudinal axis into a ride-side piece and a left-side piece, then the right-side piece would have a center of mass, $CM_R$, and the left-side piece would have a center of mass, $CM_L$. If the $CM_R$ and the $CM_L$ are symmetric about the longitudinal axis, then the center of mass of the load beam component will lie along its longitudinal axis.

The presence of the shim creates a mass imbalance in the construction of the load beam, between the right side of the load beam and the left side of the load beam. This imbalance creates an asymmetric distribution of the center of mass of the right side of the load beam and the center of mass of the left side of the load beam about the longitudinal axis, resulting in a center of mass of the load beam that does not lie along the longitudinal axis. It can be appreciated that such an imbalance can be created in the load beam itself where there is an unequal distribution of mass in the structure of the load beam, in addition to any structure or structures attached to the load beam.

Figure 2:
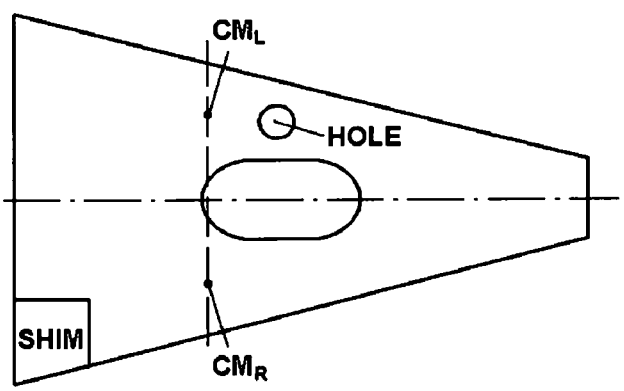
FIG. 2 is a simplified view of an asymmetric full thickness load beam of a suspension assembly with a lightening hole according to an embodiment of the present invention.

FIG. 2 is a simplified view of the asymmetric full thickness load beam of FIG. 1 configured a feature in accordance with the present invention. A lightening hole can be formed in the material of the load beam. The lightening hole is a feature that reduces the mass of the load beam. FIG. 2 shows a lightening hole feature provided on the left side to change the mass distribution of the left side so as to change the location of the left-side center of mass. The lightening hole is sized and located on the left side of the load beam depending on the unequal mass distribution (whether as a result of attachment of a component to the load beam such as a shim, or whether the structure of the load beam itself has uneven mass distribution) the $CM_L$ is symmetric about the longitudinal axis with respect to the $CM_R$, thus positioning the center of mass of the load beam along its longitudinal axis. This "coincidence" or alignment of centers of gravity is illustrated in the figure by the line drawn through $CM_R$ and $CM_L$.

Figure 3:
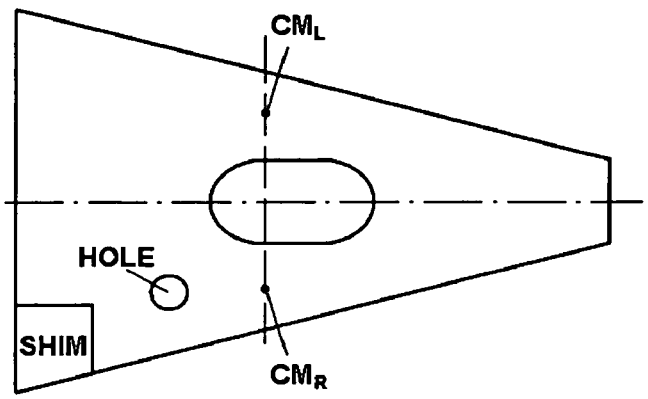
FIG. 3 is a simplified view of an asymmetric full thickness load beam of a suspension assembly with an alternative lightening hole according to an embodiment of the present invention.

FIG. 3 is a simplified view of an asymmetric full thickness load beam of a suspension assembly with an alternatively placed lightening hole to bring the center of mass of the right side of the load beam into coincidence with respect to the left-side center of mass about the longitudinal axis, thus positioning the center of mass of the load beam along its longitudinal axis.

FIGS. 2 and 3 illustrate that the center of mass of one side or the other can be re-positioned using a lightening hole. FIG. 2 shows that the position of the center of mass of the left side of the load beam can be altered, while FIG. 3 shows that the position of the center of mass of the right side of the load beam can be altered. Although not shown, it can be appreciated of course that suitably-sized and suitable positioned lightening holes can be provided on both the left side and the right side of the load beam to adjust the locations of both centers of mass $CM_L$, $CM_R$ so that they are symmetric about the longitudinal axis.

Figure 4:
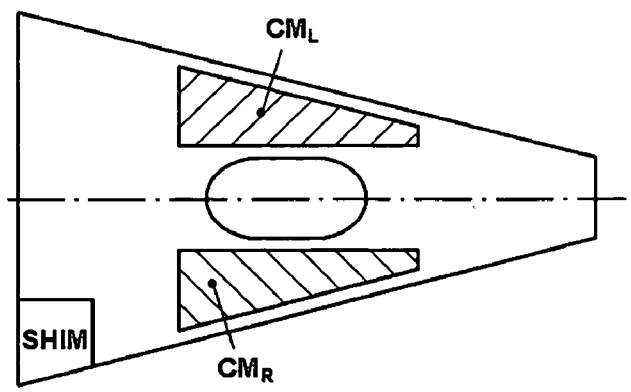
FIG. 4 is a simplified view of an asymmetric load beam according to an embodiment of the present invention with non-coincidence right center of mass ($CM_R$) and left center of mass ($CM_L$) about the longitudinal axis.

FIG. 4 is a simplified view of another asymmetric load beam configuration in which the $CM_R$ and $CM_L$ are not symmetric about the longitudinal axis due to uneven distribution of mass. The figure shows partially etched areas ("partial thickness areas" shown with shading) in each of the ride side and the left side of the load beam, thus creating portions of the load beam having different thicknesses.

Figure 5:
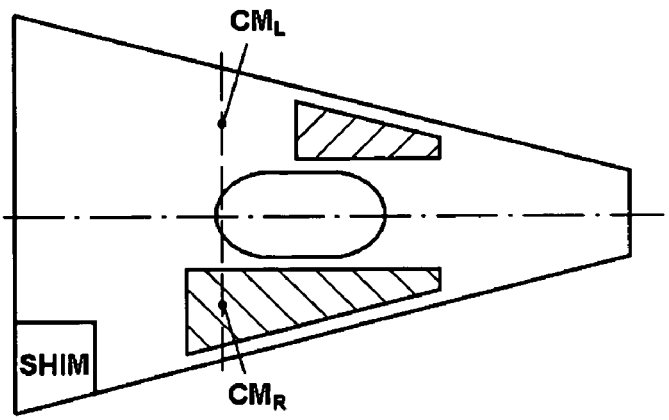
FIG. 5 is a simplified view of an asymmetric load beam according to an embodiment of the present invention with one or more asymmetric partial thickness areas.

FIG. 5 is a simplified view of an asymmetric load beam according to another embodiment of the present invention having one or more asymmetric partial thickness area features. Given that the shim results in an even distribution of mass in the load beam, the formation of properly sized and properly positioned partial thickness areas that are asymmetric about the longitudinal axis can reposition the $CM_R$ and $CM_L$ into coincidence about the longitudinal axis. This "coincidence" or alignment of centers of gravity is illustrated in the figure by the line drawn through $CM_R$ and $CM_L$. FIG. 5 shows the formation of a partial thickness area on the left side of the load beam to position the $CM_L$ so that is symmetric about the longitudinal axis with respect to the $CM_R$.

Figure 6:
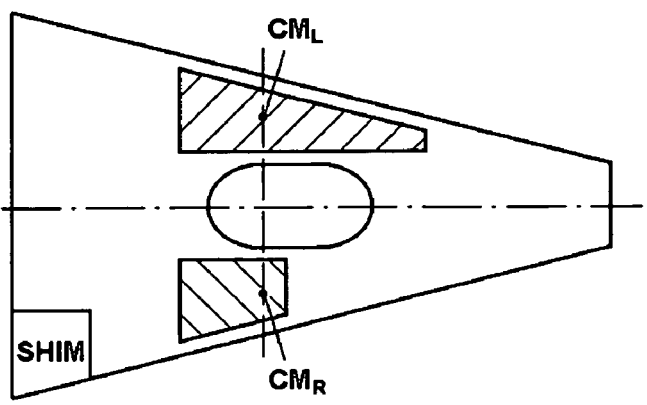
FIG. 6 is a simplified view of an asymmetric load beam with one or more partial thickness areas of a suspension assembly according to another embodiment of the present invention.

FIG. 6 is a simplified view of an asymmetric load beam with alternately configured partial thickness areas to position the $CM_R$ so that it is symmetric about the longitudinal axis with respect to the $CM_L$. This figure and FIG. 5 illustrate that the center of mass of one side of the load beam or the other can be re-positioned using partial thickness areas. Although not shown, it can be appreciated that suitably-sized and suitable positioned partial thickness areas can be provided to adjust the location of both centers of mass to achieve coincidence of the centers of mass about the longitudinal axis, instead of positioning just one of the centers of gravity.

Figure 7A:
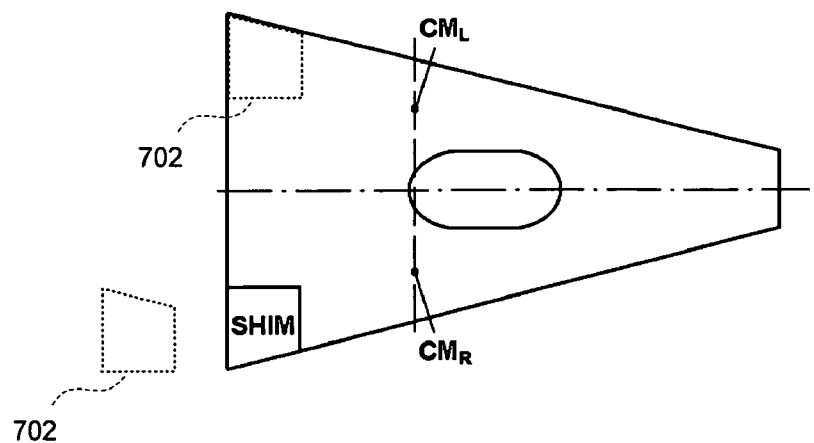
FIGS. 7A and 7B are simplified views of an asymmetric load beam with the addition of material to a suspension assembly according to alternate embodiments of the present invention.
Figure 7B:
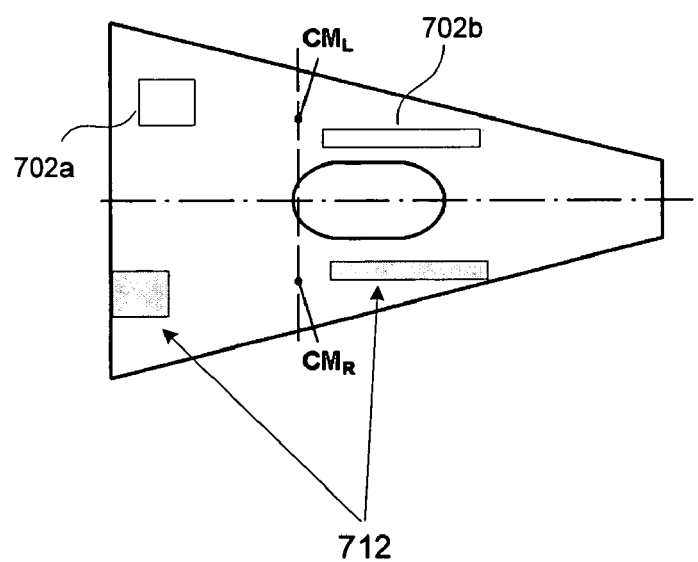

Refer now to FIGS. 7A and 7B for a discussion of yet another embodiment of the present invention. FIGS. 1 and 8 illustrate that the addition of a shim creates an asymmetric distribution of mass. The foregoing embodiments illustrate examples whereby the selective subtraction or removal of material from the load beam can be used to restore symmetry in terms of the center of mass of the load beam.

FIG. 7A shows an example whereby the selective addition of material to the load beam can produce the same result as selectively removing material. The figure shows the addition of a suitable counterweight 702 to the load beam to adjust the center of mass of the load beam according to the present invention. The mass of the counterweight 702 will depend on its location of attachment to the load beam. The material of the counterweight 702 can be the same as that of the object that created the mass imbalance; for example, the shim in FIG. 7A. The material of the counterweight 702 can be that of the load beam, and in general can be any suitable material or composition of materials. The attachment of the counterweight 702 can be by any known suitable attachment method, for example, epoxy glue, welding, and so on. The shape of the counterweight 702 can match the shape of the object (e.g., shim), and in general can be any suitable shape.

In most cases, however, it may be desirable to match the shape of the counterweight 702 to the structure that created the mass imbalance in the first place. The counterweight 702 can be positioned so that the moments of inertia in the load beam component are symmetric, in addition to locating the center of mass of the load along a symmetric axis such as the longitudinal axis shown in the figures. The embodiment shown in FIG. 7A shows such an arrangement wherein the counterweight 702 is disposed on the surface of the load beam opposite the surface.

It can be appreciated of course that symmetry of the moments of inertia may not be necessary (or even desirable) in some special situations. The present invention therefore does not require the addition of material for the purpose of achieving symmetrical arrangement of moments of inertia.

FIG. 7B shows the use of two counterweights 702*a*, 702*b* and in general illustrates the fact that more than one counterweight can be used to offset one or more than one object 712 that create a mass imbalance. The counterweights can be shaped and/or distributed accordingly depending on their individual sizes and material composition. Though not shown, it can be readily appreciated that the subtraction of material and addition of material can be combined to adjust the center of mass in accordance with the present invention.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A suspension assembly for a hard disk drive, the suspension assembly comprising:
    a hinge member comprising a first strut and a second strut, each of the first and second struts extending in a longitudinal direction, the first strut being disposed by a vertical offset from the second strut;
    a load beam having a first end and a second end, a length in the longitudinal direction being defined between the first end and the second end; and
    a longitudinal axis defining a first side and a second side of the load beam, the load beam having asymmetrical structure about the longitudinal axis;
    wherein the first strut and the second strut couple to the load beam on opposite sides of the longitudinal axis of the load beam at about the second end;
    wherein the load beam is mass-balanced by lightening the first side of the load beam such that a center of mass of the first side is brought into coincidence about the longitudinal axis with a center of mass of the second side.

2. The suspension assembly of claim 1 wherein the load beam includes at least one lightening hole formed therethrough, the at least one lightening hole formed on the first side of the load beam, the at least one lightening hole being positioned such that a center of mass of the first side is symmetric about the longitudinal axis with respect to a center of mass of the second side.

3. The suspension assembly of claim 1 wherein the at least one lightening hole comprises a first lightening hole formed on the first side and a second lightening hole formed on the second side, the first and second lightening holes being sized and positioned so that the center of mass of the load beam lies on the longitudinal axis.

4. The suspension assembly of claim 1 wherein the load beam includes at least one partial etch area such that a center of mass of the first side is symmetric about the longitudinal axis with respect to a center of mass of the second side.

5. The suspension assembly of claim 4 wherein the at least one partial etch area includes a first partial etch area disposed on the first side and a second partial etch area disposed on the second side.

6. The suspension assembly of claim 1 wherein the load beam includes a balancing mass disposed thereon and positioned so that a center of mass of the first side is symmetric about the longitudinal axis with respect to a center of mass of the second side.

7. A suspension assembly in a hard disk drive comprising:
    a hinged member comprising a first strut and a second strut, each of the first and second struts extending in a longitudinal direction, the first strut having a vertical offset relative to the second strut; and
    a load beam having a first end and a second end, a length in the longitudinal direction being defined between the first end and the second end; and
    a longitudinal axis lying along the longitudinal direction and defining a first side of the load beam and a second side of the load beam, the load beam having asymmetrical structure about the longitudinal axis, where the first strut and the second strut couple to the load beam on opposite sides of the longitudinal axis of the load beam at about the second end; and
    at least one of the first side of the load beam and the second side of the load beam having at least one feature formed in the material thereof to position the center of mass of the load beam along the longitudinal axis.

8. The suspension assembly of claim 7 wherein the load beam includes at least one lightening hole formed therethrough, the at least one lightening hole formed on the first side of the load beam, the at least one lightening hole being positioned such that a center of mass of the first side is symmetric about the longitudinal axis with respect to a center of mass of the second side.

9. The suspension assembly of claim 8 wherein the at least one lightening hole comprises a first lightening hole formed on the first side and a second lightening hole formed on the second side, the first and second lightening holes being sized and positioned so that the center of mass of the load beam lies on the longitudinal axis.

10. The suspension assembly of claim 7 wherein the load beam includes at least one partial etch area such that a center of mass of the first side is symmetric about the longitudinal axis with respect to a center of mass of the second side.

11. The suspension assembly of claim 7 wherein the at least one feature comprises a counterweight disposed on a surface of the load beam.

12. A load beam in a hard disk drive for a suspension assembly for suspending a read-write head assembly, the load beam having an asymmetric distribution of mass, the load beam having one or more features to position its center of mass along its longitudinal axis, wherein the one or more features comprise at least one lightening hole formed through the load beam, the at least one lightening hole formed on a first side of the longitudinal axis, the at least one lightening hole being positioned such that a center of mass of the first side is symmetric about the longitudinal axis with respect to a center of mass of a second side of the longitudinal axis.

13. A load beam in a hard disk drive for a suspension assembly for suspending a read-write head assembly, the load beam having an asymmetric distribution of mass about said longitudinal axis, the load beam having one or more features to position its center of mass along its longitudinal axis, wherein the one or more features comprise a first lightening hole formed on a first side of the longitudinal axis and a second lightening hole formed on a second side of the longitudinal axis, the first and second lightening holes being sized and positioned so that the center of mass of the load beam lies on the longitudinal axis.

14. The load beam of claim 13 in which said lightening holes define a pattern of lightening holes that is asymmetric about said longitudinal axis of said load beam.

* * * * *